(12) United States Patent
Suda et al.

(10) Patent No.: US 11,458,565 B2
(45) Date of Patent: Oct. 4, 2022

(54) WELDMENT MANUFACTURING METHOD, WELDMENT MANUFACTURING SYSTEM, AND WELDMENT

(71) Applicant: MITSUBISHI HEAVY INDUSTRIES, LTD., Tokyo (JP)

(72) Inventors: Naoki Suda, Tokyo (JP); Shuho Tsubota, Tokyo (JP); Yasuyuki Fujiya, Tokyo (JP); Yasutaka Banno, Tokyo (JP); Satoru Zenitani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 283 days.

(21) Appl. No.: 16/720,167

(22) Filed: Dec. 19, 2019

(65) Prior Publication Data

US 2020/0262003 A1    Aug. 20, 2020

(30) Foreign Application Priority Data

Feb. 19, 2019  (JP) .............................. JP2019-027846

(51) Int. Cl.
*B23K 26/00*  (2014.01)
*B23K 26/082*  (2014.01)
*B23K 26/342*  (2014.01)
*B23K 9/04*  (2006.01)
*B23K 26/067*  (2006.01)
(Continued)

(52) U.S. Cl.
CPC ............ *B23K 26/0093* (2013.01); *B23K 9/04* (2013.01); *B23K 26/0676* (2013.01); *B23K 26/0734* (2013.01); *B23K 26/082* (2015.10); *B23K 26/123* (2013.01); *B23K 26/342* (2015.10)

(58) Field of Classification Search
CPC .............. B23K 26/0093; B23K 26/082; B23K 26/342; B23K 9/04; B23K 26/0734; B23K 26/123
USPC ............................................................ 219/75
See application file for complete search history.

(56) References Cited

U.S. PATENT DOCUMENTS

| | | | | |
|---|---|---|---|---|
| 4,634,832 A | * | 1/1987 | Martyr | B23K 26/0665 219/121.84 |
| 4,915,981 A | * | 4/1990 | Traskos | B23K 26/382 216/65 |

(Continued)

FOREIGN PATENT DOCUMENTS

| | | |
|---|---|---|
| AT | 405379 | 7/1999 |
| EP | 2 604 376 | 6/2013 |

(Continued)

OTHER PUBLICATIONS

Extended European Search Report dated Aug. 5, 2020 in corresponding European Patent Application No. 19218189.9.

*Primary Examiner* — Jimmy Chou
(74) *Attorney, Agent, or Firm* — Wenderoth, Lind & Ponack, L.L.P.

(57) ABSTRACT

A weldment manufacturing method includes drilling that forms a hole on a workpiece, feeding a filler material to the hole and putting the filler material on a bottom of the hole, and melting the filler material by emitting a laser beam to the hole while scanning with the laser beam, so as to fill the hole with the melted filler material. By repeating the feeding and the melting, a weld repairing portion filling the hole is formed.

9 Claims, 8 Drawing Sheets

(51) Int. Cl.
*B23K 26/073* (2006.01)
*B23K 26/12* (2014.01)

(56) References Cited

U.S. PATENT DOCUMENTS

| | | | | | |
|---|---|---|---|---|---|
| 5,607,605 | A | * | 3/1997 | Musasa | B23K 26/032<br>219/121.64 |
| 5,837,964 | A | * | 11/1998 | Emer | B23K 26/389<br>219/121.71 |
| 6,127,250 | A | * | 10/2000 | Sylvester | H01L 21/4857<br>438/584 |
| 6,518,543 | B1 | * | 2/2003 | Benz | B23K 26/0665<br>219/121.73 |
| 6,646,225 | B1 | * | 11/2003 | Wang | B23K 26/0608<br>219/121.64 |
| 6,781,092 | B2 | * | 8/2004 | De Steur | H05K 3/0032<br>219/121.79 |
| 7,176,406 | B2 | * | 2/2007 | Verschueren | B23K 26/38<br>219/121.73 |
| 7,253,377 | B2 | * | 8/2007 | Wang | B23K 26/0604<br>219/121.45 |
| 7,259,354 | B2 | * | 8/2007 | Pailthorp | B23K 26/389<br>219/121.72 |
| 7,851,984 | B2 | * | 12/2010 | Zdeblick | H01T 13/39<br>313/142 |
| 8,561,298 | B2 | * | 10/2013 | Morin | C22F 1/10<br>29/889 |
| 8,592,715 | B2 | * | 11/2013 | Wang | B23K 26/0604<br>219/136 |
| 8,653,417 | B2 | * | 2/2014 | Peters | B23K 9/0671<br>219/130.21 |
| 9,095,928 | B2 | * | 8/2015 | Ash | B23K 26/211 |
| 11,148,230 | B2 | * | 10/2021 | Litoshenko | C23C 16/042 |
| 2002/0117485 | A1 | * | 8/2002 | Jones | B23P 6/005<br>219/121.64 |
| 2002/0134768 | A1 | * | 9/2002 | Akaba | B23K 26/0604<br>219/121.63 |
| 2003/0047544 | A1 | * | 3/2003 | De Steur | H05K 3/0032<br>219/121.71 |
| 2004/0222197 | A1 | * | 11/2004 | Hiramatsu | B23K 26/0853<br>700/166 |
| 2005/0006355 | A1 | * | 1/2005 | De Dinechin | B23K 28/02<br>219/137 R |
| 2005/0103754 | A1 | * | 5/2005 | Olsen | B23K 15/10<br>219/121.14 |
| 2012/0325787 | A1 | * | 12/2012 | Hamada | B23K 26/262<br>219/121.64 |
| 2013/0153543 | A1 | | 6/2013 | Tsubota et al. | |
| 2013/0343899 | A1 | * | 12/2013 | Nishioka | B23K 9/167<br>219/76.14 |
| 2014/0116091 | A1 | * | 5/2014 | Chuang | C03C 23/0025<br>65/31 |
| 2015/0027997 | A1 | * | 1/2015 | Miklos | B23K 10/02<br>219/137 R |
| 2015/0224607 | A1 | * | 8/2015 | Bruck | B22F 3/105<br>228/56.3 |
| 2017/0014956 | A1 | * | 1/2017 | Bruck | B23K 26/342 |
| 2019/0308274 | A1 | * | 10/2019 | Roesner | H01L 21/3065 |
| 2020/0016703 | A1 | * | 1/2020 | Maritano | B23K 26/0626 |
| 2021/0323092 | A1 | * | 10/2021 | Morita | B23K 26/0884 |

FOREIGN PATENT DOCUMENTS

| | | | | |
|---|---|---|---|---|
| EP | 2604376 A1 | * | 6/2013 | ......... B23K 26/0093 |
| JP | 2-49199 | | 10/1990 | |
| JP | 03-142085 | | 6/1991 | |
| JP | 4246878 | | 4/2009 | |
| JP | 2013-126668 | | 6/2013 | |
| JP | 2013126668 A | * | 6/2013 | ......... B23K 26/0608 |
| JP | 2017-202509 | | 11/2017 | |
| WO | WO-2017177411 A1 | * | 10/2017 | ......... B23K 26/0643 |

\* cited by examiner

WELDMENT MANUFACTURING METHOD, WELDMENT MANUFACTURING SYSTEM, AND WELDMENT

CROSS-REFERENCE TO RELATED APPLICATIONS

The present application claims priority to and incorporates by reference the entire contents of Japanese Patent Application No. 2019-027846 filed in Japan on Feb. 19, 2019.

FIELD

The present disclosure relates to a weldment manufacturing method, a weldment manufacturing system, and a weldment.

BACKGROUND

An example of methods for forming a weld repairing portion on an object, Patent Literature 1 discloses an overlay welding method. The overlay welding includes a preparing step of forming a bottomed depression having a circumferential surface serving as a surface to be overlaid, an overlaying step at which a filler material is fed toward a bottom face of the depression and a laser beam serving as a heat source is emitted on the bottom face of the depression to which the filler material is fed, thereby forming an overlaid portion reaching the surface to be overlaid while the bottom face is filled with the melted filler material, a re-preparing step of forming a new depression reaching the bottom face of the depression in a base material after the overlaying step, and a re-overlaying step of performing overlaying welding on the new depression in the same manner as the overlaying step.

CITATION LIST

Patent Literature

Patent Literature 1: Japanese Patent Application Laid-open No. 2013-126668

SUMMARY

Technical Problem

The method described in Patent Literature 1 can perform the overlay welding while reducing influence on the base material in such a manner that the weldment is formed at the object position and another weldment is further overlaid on the weldment. The overlay welding, however, needs a processing region having a certain area. In order to keep the region for overlay welding, a region formed by cutting becomes large in a sound region. If no processing region is kept in the method described in Patent Literature 1, a laser beam cannot be appropriately emitted to the filler material, thereby increasing a possibility of occurrence of defects in the welded portion.

The present disclosure is made to solve such problems, and an object of the present disclosure is to provide a weldment manufacturing method and a weldment manufacturing system that can form a weld repairing portion while reducing influence on a weldment serving as a workpiece, and a weldment having the weld repairing portion.

Solution to Problem

To achieve the object, a weldment manufacturing method according to an embodiment of the present disclosure includes drilling a hole on a workpiece; feeding a filler material to the hole and putting the filler material on a bottom of the hole; and melting the filler material by emitting a laser beam to the hole while scanning with the laser beam, so as to fill the hole with the melted filler material. A weld repairing portion filling the hole is formed by repeating the feeding and the melting.

At the melting, the laser beam is preferably caused to scan along a circumferential surface of the hole.

At the melting, a path of the laser beam is preferably concentric multiple circles composed of a plurality of circles having different diameters and arranged in a concentric manner.

At the melting, the path of the laser beam satisfies that heat input near a border between the hole and the filler material is preferably larger than heat input on a center side of the hole.

At the melting, the laser beam is preferably caused to scan at a speed between 1 m/sec and 10 m/sec inclusive.

At the melting, a beam diameter of the laser beam is preferably between 0.6 mm and 1.6 mm inclusive.

It is preferable that the workpiece includes a first metallic member, a second metallic member, and a weld line that bonds the first metallic member and the second metallic member, and at least a part of the weld repairing portion overlaps with the weld line.

The hole preferably satisfies that H/d is between 5 and 20 inclusive and d is between 1 mm and 20 mm inclusive where H is a depth of the hole and d is a diameter of the hole.

The weldment manufacturing method preferably further includes performing a tungsten inert gas (TIG) welding that fills a part of the hole on a surface side of the hole using a wire-shaped filler material.

The weldment manufacturing method preferably further includes detecting a state of the hole of the workpiece and setting processing conditions for the feeding and the melting on the basis of the state of the hole.

The processing conditions preferably include at least one of a size and a quantity of the filler material to be fed, a laser irradiation position in a depth direction, a laser irradiation pattern, and laser output power.

To achieve the object, a weldment manufacturing system according to an embodiment of the present disclosure includes a drilling device configured to form a hole on a workpiece; a filler material feeding device configured to feed a filler material to the hole; a laser processing device configured to emit a laser beam to the hole while scanning with the laser beam; and a control device configured to control the drilling device, the filler material feeding device, and the laser processing device, so as to emit the laser beam from the laser processing device to the filler material fed to the hole while scanning with the laser beam, thereby melting the filler material.

To achieve the object, a weldment according to an embodiment of the present disclosure includes a first metallic member; a second metallic member; a weld line that bonds the first metallic member and the second metallic member; and a weld repairing portion that is a metallic material filled in the formed hole, the metallic material being identical to a metallic material of the weld line. The weld repairing portion satisfies that H/d is between 5 and 20 inclusive and d is between 1 mm and 20 mm inclusive where H is a depth and d is a diameter. The metallic material is layered in the weld repairing portion.

At least a part of the weld repairing portion preferably overlaps with the weld line.

The number of metallic material layers in the weld repairing portion is preferably between 1 and 20 inclusive.

The weld repairing portion preferably has a shape having a diameter changing in a depth direction.

Advantageous Effects of Invention

The disclosure can form the weld repairing portion while reducing influence on the weldment serving as the workpiece.

DESCRIPTION OF EMBODIMENTS

The following describes embodiments according to the disclosure in detail with reference to the accompanying drawings. The embodiments do not limit the invention. The constituent elements described in the following embodiments include those replaceable and easily envisaged by those skilled in the art and substantially identical ones.

Figure 1:
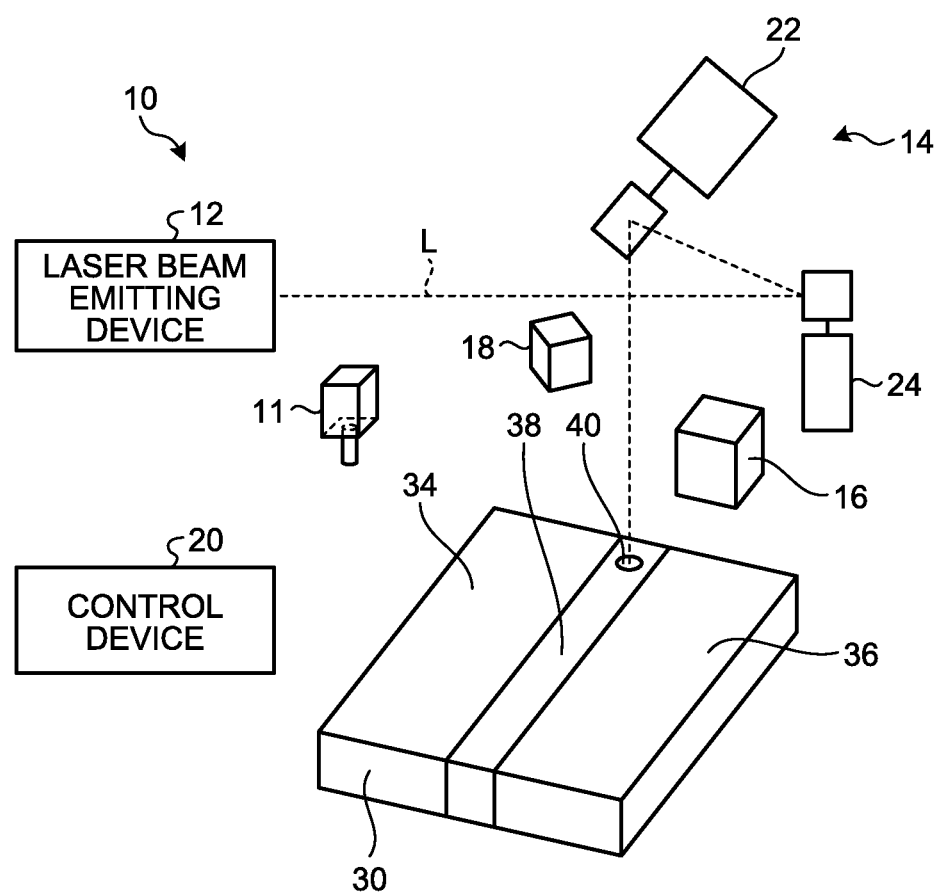
FIG. 1 is a schematic diagram illustrating a schematic structure of a weldment manufacturing system according to an embodiment of the disclosure.
Figure 2:
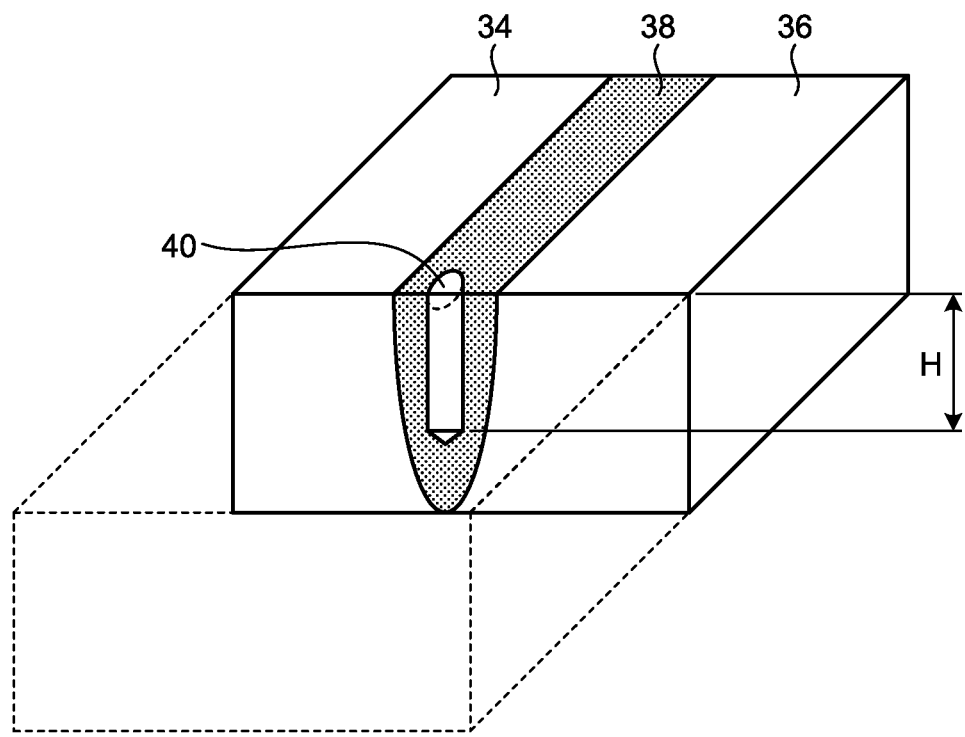
FIG. 2 is a schematic diagram illustrating a schematic structure of a weldment serving as a workpiece.
Figure 3:
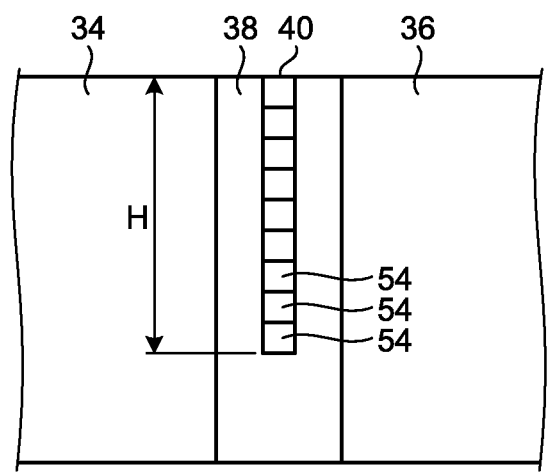
FIG. 3 is a cross-sectional view schematically illustrating a weld repairing portion of the weldment.
Figure 4:
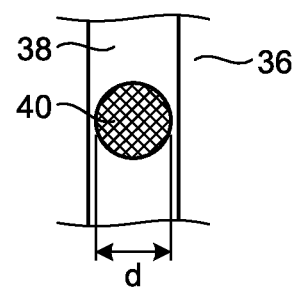
FIG. 4 is a front view schematically illustrating the weld repairing portion of the weldment.
Figure 5:
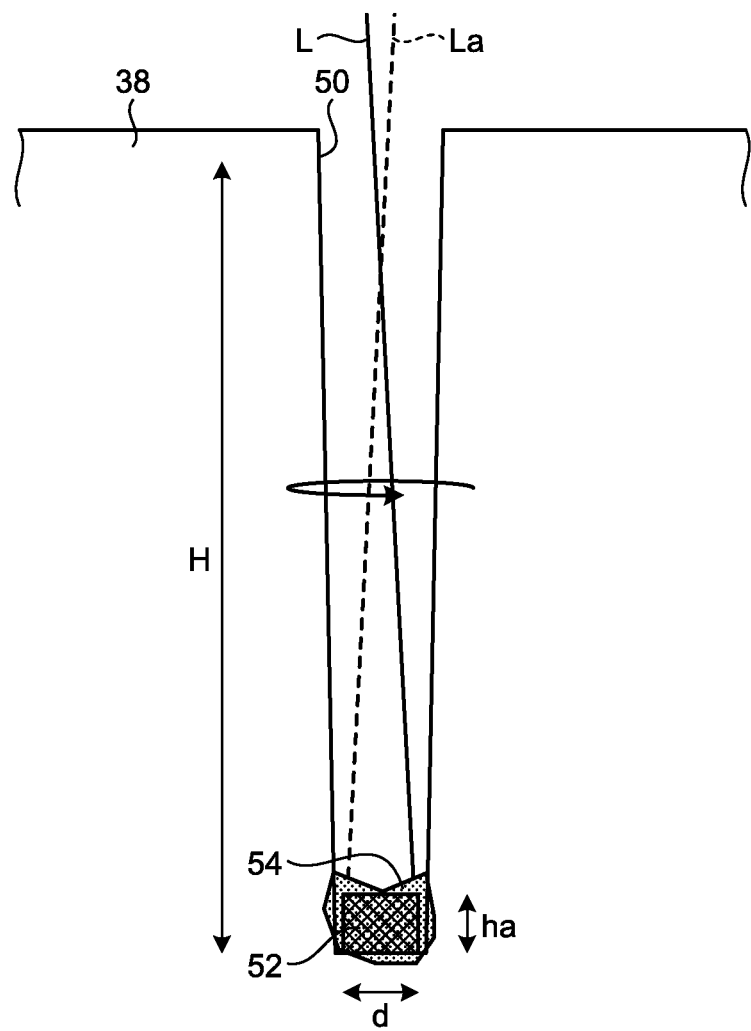
FIG. 5 is an explanatory view explaining operation of the weldment manufacturing system.

FIG. 1 is a schematic diagram illustrating a schematic structure of a weldment manufacturing system according to an embodiment of the disclosure. FIG. 2 is a schematic diagram illustrating a schematic structure of a weldment serving as a workpiece. FIG. 3 is a cross-sectional view schematically illustrating a weld repairing portion of the weldment. FIG. 4 is a front view schematically illustrating the weld repairing portion of the weldment. FIG. 5 is an explanatory view explaining operation of the weldment manufacturing system.

A weldment manufacturing system 10 forms a weld repairing portion 40 on a weldment 30 serving as a workpiece. As illustrated in FIG. 1, the weldment manufacturing system 10 includes a drilling device 11, a laser beam emitting device 12, a laser beam scanning device 14, a filler material feeding device 16, a state detector 18, and a control device 20. The weldment manufacturing system 10 may include a moving mechanism that adjusts relative positions between the weldment 30 and each of the processing devices and jigs that fix the relative positions.

The drilling device 11 forms a hole on the weldment 30. The drilling device 11 forms a hole on the weldment 30 using a processing jig such as a drill. The drilling device 11 can form a hole having a diameter between 1 mm and 10 mm inclusive and a depth between 5 mm and 10 mm inclusive. The drilling device 11 can also use a device that emits a laser beam to form a hole.

The laser beam emitting device 12 outputs a laser beam. For the laser beam emitting device 12, a fiber laser output device or a short pulse laser output device can be used. Examples of the usable fiber laser output device include a Fabry Perot fiber laser output device and a ring fiber laser output device. Such output devices are excited, so as to oscillate a laser beam. For the fiber of the fiber laser output device, silica glass can be used to which rare earth elements such as erbium (Er), neodymium (Nd), and ytterbium (Yb) are added, for example. In the embodiment, for the fiber laser output device, lasers can also be used that perform pulsed oscillation having a pulse width of a microsecond order or less such as a YAG laser and a YVO4 laser. The short pulse laser output device can use a titanium sapphire laser as the laser oscillation source, for example, and can oscillate a pulse having a pulse width equal to or smaller than 100 picoseconds. In the embodiment, the short pulse laser output device outputs a short pulse laser beam having a pulse width equal to or smaller than 100 microseconds. For the short pulse laser output device, lasers are used that preferably have a pulse width equal to or smaller than 100 nanoseconds, and more preferably have a pulse width equal to or smaller than 1 nanosecond.

The laser beam emitting device 12 preferably has an output laser power between 5 kW and 10 kW inclusive, more preferably between 3 kW and 9 kW inclusive. The laser beam emitting device 12 preferably emits a laser beam having a beam diameter between 0.6 mm and 1.6 mm inclusive. The laser beam emitting device 12 preferably has a defocusing amount equal to or larger than 70 mm.

The laser beam emitting device 12 preferably uses a single mode high power laser beam because a scanning pattern can be more precisely controlled due to a small laser beam diameter. The laser beam emitting device 12 may use a multi mode.

The laser beam scanning device 14 emits a laser beam emitted from the laser beam emitting device 12 to the weldment 30 while scanning with the laser beam. The laser beam scanning device 14 includes a first galvanometer mirror 22 and a second galvanometer mirror 24. The first galvanometer mirror 22 and the second galvanometer mirror 24 change reflection direction of the laser beam emitted from the laser beam emitting device 12 by changing their orientations. The laser beam scanning device 14 changes the position of the laser beam with which the weldment 30 is irradiated on a two-dimensional plane by differentiating the rotation directions between the first galvanometer mirror 22 and the second galvanometer mirror 24. The laser beam scanning device 14 preferably performs scanning at a speed between 1 m/sec and 10 m/sec inclusive.

In the weldment manufacturing system 10, a combination of the laser beam emitting device 12 and the laser beam scanning device 14 serves as a laser processing device. The laser processing device emits a laser beam at an interval equal to or smaller than 1 mm when a pulse laser beam is used. A laser irradiation time is preferably between 1 second and 30 seconds inclusive and more preferably between 5 seconds and 21 seconds inclusive.

The laser processing device only needs to scan the laser beam for irradiation. For example, the laser processing device may include a number of arrayed laser elements that each emit a laser beam and may scan an irradiation position with the laser beam by switching the laser elements each emitting a laser beam.

The filler material feeding device 16 feeds, to the hole, a filler material having a certain size according to the size of the hole of the weldment. The filler material is made of the same metal as a weld line. For the filler material, at least one of a material formed by cutting a wire, powder, and a block-shaped base material can be used. The filler material feeding device 16 may have a plurality of filler materials having a certain size or cut the filler material to have the certain size.

The state detector 18 detects a state of the welding position on the weldment 30 processed by the weldment manufacturing system 10. The state detector 18 has an imaging unit that takes the image at the position which is irradiated with the laser beam, e.g., a camera having a charge coupled device (CCD) image sensor. The state detector 18 detects the state of the welding position on the weldment 30 processed by the weldment manufacturing system 10 on the basis of the acquired image. The state detector 18 is not limited to use the imaging device. The state detector 18 can also use a position sensor or a temperature sensor. The state detector 18 may use a position sensor to detect a depth of the processed hole, and/or may use a temperature sensor detecting a temperature at the processing position to detect the state of the hole.

The control device 20 controls the devices in the weldment manufacturing system 10. The control device 20 controls the whole operation of forming a hole on the weldment 30 by the drilling device 11, feeding the filler material to the formed hole by the filler material feeding device 16, and melting the filler material by the laser processing device. The control device 20 adjusts processing conditions on the basis of the state detected by the state detector 18.

The following describes the weldment 30, which is the workpiece on which the weld repairing portion 40 is formed by the weldment manufacturing system 10. The weldment 30 has a first metallic member 34, a second metallic member 36, a weld line 38, and the weld repairing portion 40.

In the weldment 30, the first metallic member 34 and the second metallic member 36 are bonded with the weld line 38. The first metallic member 34 and the second metallic member 36 may be the same metal or different metals. The weldment 30 may be a cylindrical member and have a structure in which both ends of a single plate-like member, in which the first metallic member 34 and the second metallic member 36 are integrated, are bonded with the weld lines 38.

The weld line 38 is formed between the first metallic member 34 and the second metallic member 36 and bonds the first metallic member 34 and the second metallic member 36. The weld line 38 can be formed by welding using a filler material, such as tungsten inert gas (TIG) welding, and welding that melts the first metallic member 34 and the second metallic member 36 to bond them, such as electron beam welding. The weld metal is not limited to any particular specific metal.

The weld repairing portion 40 is formed on a part of the weld line 38. The weld repairing portion 40 is a welded portion formed by laser welding that melts the filler material. The weld repairing portion 40 is formed of the same metallic material as the weld line 38. The weld repairing portion 40 is made by a welding work different from that for the weld line 38. The border of the weld repairing portion 40, thus, can be identified. In the weld repairing portion 40, a plurality of filled portions 54, each of which is formed by being melted by emitting scanning laser beams L and La to the filler material 52 as illustrated in FIG. 5, are layered in the height direction as illustrated in FIG. 3. The weld repairing portion 40 has a structure in which the multiple filled portions 54, each of which is the filler material 52 solidified after being melted, are layered in the height direction in a hole 50 formed on the weld line 38, so as to fill the hole 50. The number of layered filled portions 54 of the weld repairing portion 40 is preferably between 1 and 20 inclusive. The number of layered filled portions 54 is 1 or more. The filled portions 54 are preferably layered in a plural number. The number of layered filled portions 54 is, thus, 2 or more or preferably 5 or more. The number of layers in the described range makes it possible to efficiently form the layers and prevent the occurrence of defects and gaps in manufacturing. The weld repairing portion 40 has a shape formed by the filled portions 54 filled in the hole extending in the depth direction (direction perpendicular to the surface of the weldment 30). The weld repairing portion 40 may have such a tapered shape that the diameter is increased toward the surface of the weldment 30. The diameter of the weld repairing portion 40 may change in the depth direction.

The weld repairing portion 40 preferably satisfies that H/d is between 5 and 20 inclusive where H is the depth (height) and d is the diameter. The depth (height) H of the weld repairing portion 40 satisfies that H is between 20 mm and 300 mm inclusive, preferably between 5 mm and 100 mm. The diameter d of the weld repairing portion 40 satisfies that d is between 1 mm and 20 mm inclusive. As an example, d is preferably 5 mm.

As described in the embodiment, the weldment manufacturing system 10 can repair a defect of the weld line 38 by providing the weld repairing portion 40 on the weld line 38, for example. The weld repairing portion 40 is not limited to being provided on the weld line 38. The weld repairing portion 40 may be provided at any desired position on the weldment 30. For example, a part of the weld repairing portion 40 may be in contact with at least one of the first metallic member 34 and the second metallic member 36. The weld repairing portion 40 may be tilted in the depth direction. The weldment 30 only needs to be a metallic member provided with the weld repairing portion 40. The weldment 30 may be a member having no weld line 38 formed thereon.

Figure 6:
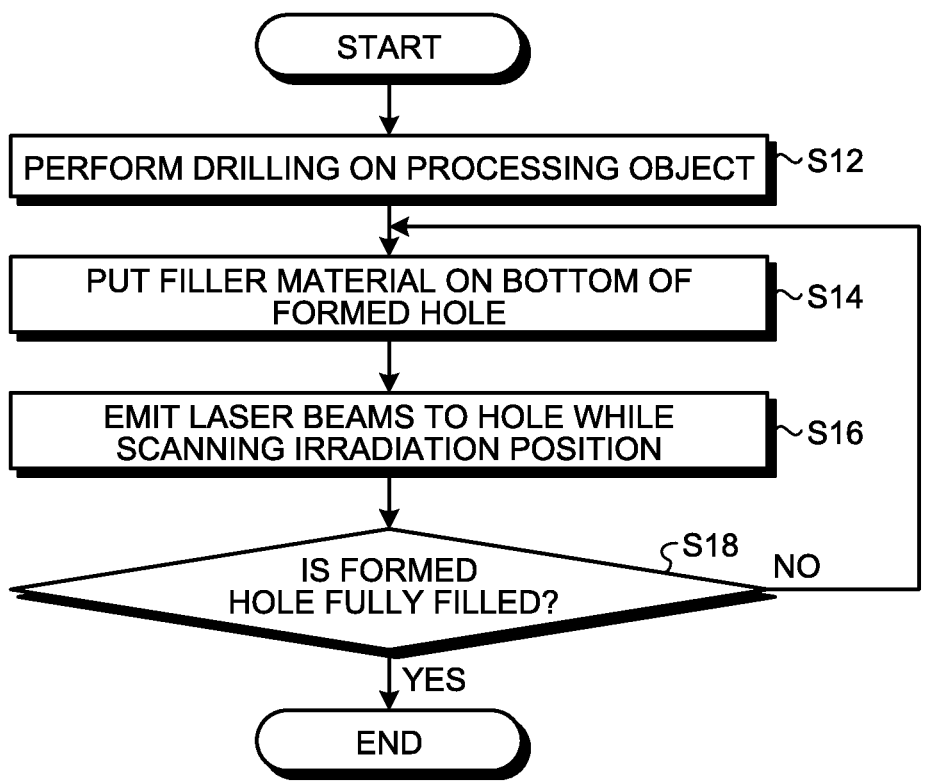
FIG. 6 is a flowchart explaining the operation of the weldment manufacturing system.
Figure 7:
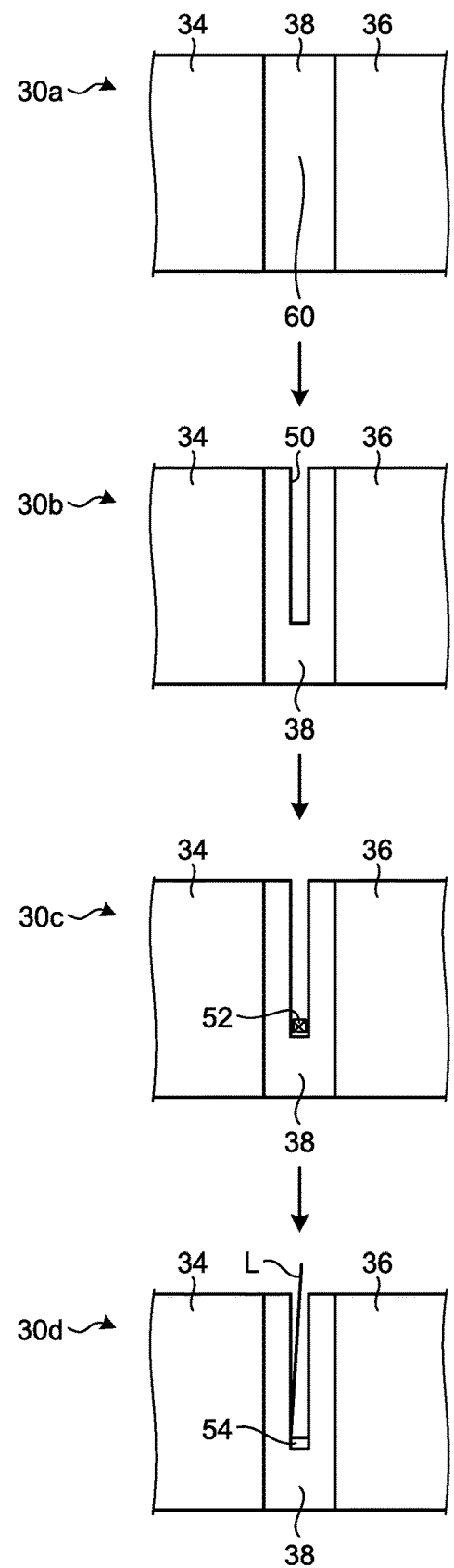
FIG. 7 is an explanatory view explaining the operation of the weldment manufacturing system.

With reference to FIGS. 6 and 7 in addition to FIG. 5, the following describes an example of operation of the weldment manufacturing system 10, i.e., an example of a weldment manufacturing method that forms the weld repairing portion 40 using the weldment manufacturing system 10. FIG. 6 is a flowchart explaining the operation of the weldment manufacturing system. FIG. 7 is an explanatory view explaining the operation of the weldment manufacturing system.

As illustrated in FIG. 5, the weldment manufacturing system 10 feeds the filler material 52 to the hole 50 formed on the weld line 38 to put the filler material 52 on the bottom of the hole 50. The weldment manufacturing system 10 emits laser beams L and La to the hole 50 from the laser beam emitting device while scanning with the laser beams La and La in a state where the filler material 52 is put on the bottom of the hole 50, so as to melt the filler material 52, thereby forming the filled portion 54 having a height ha. The height ha is shorter than the depth H of the hole 50. The weldment manufacturing system 10 forms the weld repairing portion 40 by layering the filled portions 54 in a plural number.

The following specifically describes the weldment manufacturing method with reference to FIGS. 6 and 7. The weldment manufacturing system 10 performs drilling on the weldment 30 serving as the workpiece (step S12). Specifically, a weldment 30a has a defect 60 inside the weld line 38. The weldment manufacturing system 10 removes a portion including the defect 60 of the weld line 38 as a result of drilling by the drilling device 11, thereby forming a weldment 30b having the hole 50 formed on the weld line 38.

The weldment manufacturing system 10 puts the filler material on the bottom of the formed hole (step S14). The weldment manufacturing system 10 feeds the filler material 52 having a certain size to the hole 50 by the filler material feeding device 16. In this away, the weldment manufacturing system 10 forms a weldment 30c having the hole 50 on the bottom of which the filler material 52 is put.

The weldment manufacturing system 10 emits a laser beam to the hole while scanning the irradiation position (step S16). The weldment manufacturing system 10 emits the laser beam L emitted from the laser beam emitting device 12 toward the bottom of the hole 50 to melt the filler material 52, thereby forming a weldment 30d having the hole 50 on the bottom of which the filled portion 54 is formed. Specifically, the laser beam emitting device 12 and the laser beam scanning device 14 cause the first galvanometer mirror 22 and the second galvanometer mirror 24 to scan the irradiation position with the laser beam L at a speed equal to or larger than 1 m/sec. The laser beam emitting device 12 and the laser beam scanning device 14 perform laser irradiation 300 times when a short pulse laser beam is used while moving the irradiation position in accordance with a set pattern, for example.

The weldment manufacturing system 10 determines whether the formed hole is fully filled with the filled portions 54 (step S18). If it is determined that the formed hole is not fully filled (No at step S18), the weldment manufacturing system 10 returns to step S14, at which the weldment manufacturing system 10 performs the processing to form the filled portion 54. If it is determined that the formed hole is fully filled (Yes at step S18), the product manufacturing system 10 ends the processing.

The weldment manufacturing system 10 removes a defect in the weldment by drilling and forms the weld repairing portion on the region from which the defect has been removed. The weldment manufacturing system 10 puts the filler material 52 on the hole and repeats the processing to emit the laser beam while scanning with the laser beam, thereby forming the weld repairing portion 40. The weldment manufacturing system 10 allows putting only the filler material 52 inside the hole 50 without having remaining wire, for example, in laser processing, thereby making it possible to emit the laser beam to a desired position. Processing can be performed in a state where no members hindering laser irradiation is disposed. This state allows the hole having a high aspect ratio, i.e., having a small diameter and a large depth, to be filled with the filled portions 54, as described above. The weldment manufacturing system 10, thus, can repair the defect of the weldment 30 by the weld repairing portion having a small diameter, thereby making it possible to preferably repair the defect.

The narrow-elongated weld repairing portion 40 can repair defects inside the weldment 30. The weld repairing portion 40 is formed while thermal influence to the first metallic member 34, the second metallic member 36, and the weld line 38, which are the base materials, is reduced. As a result, the defects of the weldment 30 are repaired with little influence of the repairing to the base materials, resulting in the weldment 30 having higher performance being achieved.

The weldment manufacturing system 10 emits a laser beam while scanning with the laser beam at a speed of equal to or larger than 1 m/sec, thereby allowing the hole 50 to have therein a uniformly formed heat input distribution. As a result, the filler material, and the side surface and the bottom of the hole can be uniformly melted, thereby making it possible to prevent the occurrence of defective fusion. The weldment manufacturing system 10 can optimize heat amounts necessary for the corresponding portions, thereby allowing the filler material to be melted with a small heat amount. As a result, welding can be achieved that eliminates defects such as undercut and reduces a weld heat-affected portion.

The hole 50 is not limited to being fully filled with the filled portions 54 by the weldment manufacturing system 10. The weldment manufacturing system 10 may perform TIG welding on a part of the hole on the surface side of the hole using a wire-shaped filler material. The TIG welding that welds a part of the hole on the surface side can achieve simple welding.

Figure 8:
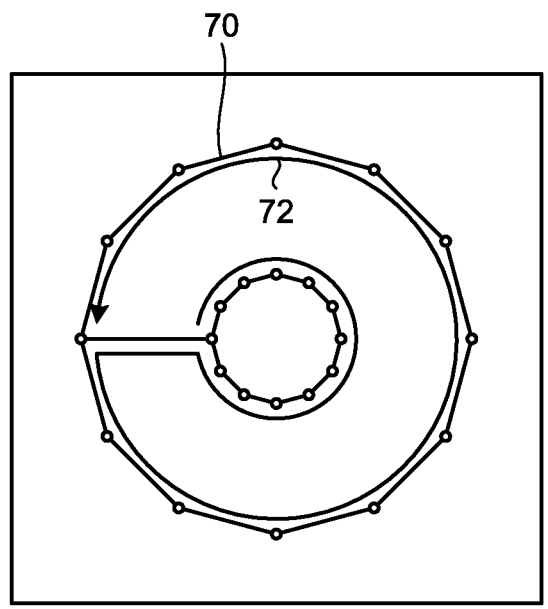
FIG. 8 is an explanatory view illustrating an example of a path of a laser beam.
Figure 9:
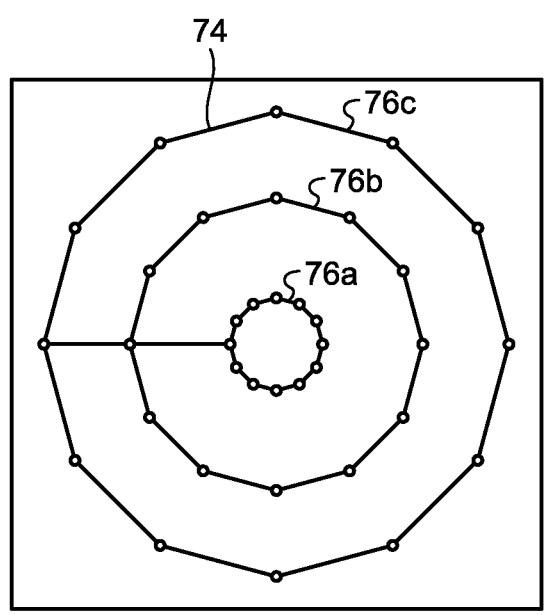
FIG. 9 is an explanatory view illustrating another example of the path of the laser beam.
Figure 10:
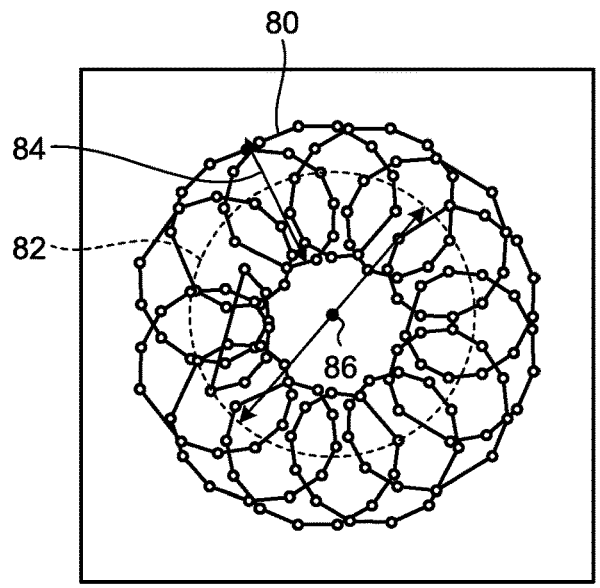
FIG. 10 is an explanatory view illustrating another example of the path of the laser beam.

The following describes a path of a laser beam that is emitted toward the filler material and scans the filler material. FIGS. 8 to 10 are explanatory views illustrating examples of the paths of the laser beam. The weldment manufacturing system 10 scans inside the hole 50 with the laser beam. The weldment manufacturing system 10 emits the laser beam to a surface of the filler material. This causes the side surface, which serves as the base material, of the hole 50 to deform, thereby making it possible to reduce influence on welding of the succeeding filled portion 54. The weldment manufacturing system 10 controls the clearance between traces on the path in the scanning, i.e., the movement interval between the laser irradiation positions, within 1 mm, thereby making it possible to prevent occurrence of spiking in laser welding.

A path 70 illustrated in FIG. 8 has a circle on the inner diameter side and a circle on the outer diameter side. The weldment manufacturing system 10 can emit the laser beam at corresponding positions on the path 70 by moving the irradiation position as illustrated with an arrow 72.

A path 74 illustrated FIG. 9 has three circles, i.e., circles 76a, 76b, and 76c having the same center and different diameters from the inner diameter side to the outer diameter side. The path 74 has the triple concentric circles, which are connected with the connecting line extending in a radial direction.

A path 80 illustrated in FIG. 10 is depicted by an epicycloidal movement in such a manner that a circle having a diameter 84, a point on which depicts the path, rolls while the center of the circle moves along a reference circle 82 having a diameter 86. The diameter 86 is larger than the diameter 84. Depicting the circle with the center thereof that moves along the reference circle 82 allows the filler material to be preferably melted.

The weldment manufacturing system 10 sets the laser beam scanning pattern to concentric multiple circles, so as to provide necessary heat amounts appropriately to the respective portions, thereby making it possible to continuously melt the filler material with a smaller heat amount. The weldment manufacturing system 10, thus, can prevent the occurrence of defects such as undercut, thereby further reducing the weld heat-affected portion. When the path is the concentric multiple circles, scanning with laser beams is preferably performed sequentially from the circle on the inner diameter side to the circle on the outer diameter side. The weldment manufacturing system 10 may use a spiral path beside the concentric multiple circles.

The weldment manufacturing system 10 preferably sets the path of the laser beam such that heat input on the outer circumferential surface side of the hole, i.e., near the boundary between the hole and the filler material, is larger than that on the center side of the hole. The path of the laser beam is preferably set such that a region along the wall surface of the hole is more frequently scanned than a region on the center side of the hole. For example, for the path 70 in FIG. 8 and the path 74 in FIG. 9, the number of scans preferably increases as the path becomes closer to the outer diameter side. This configuration can prevent the occurrence of defective fusion between the weld repairing portion 40 and the weld line 38, i.e., weld defects.

Figure 11:
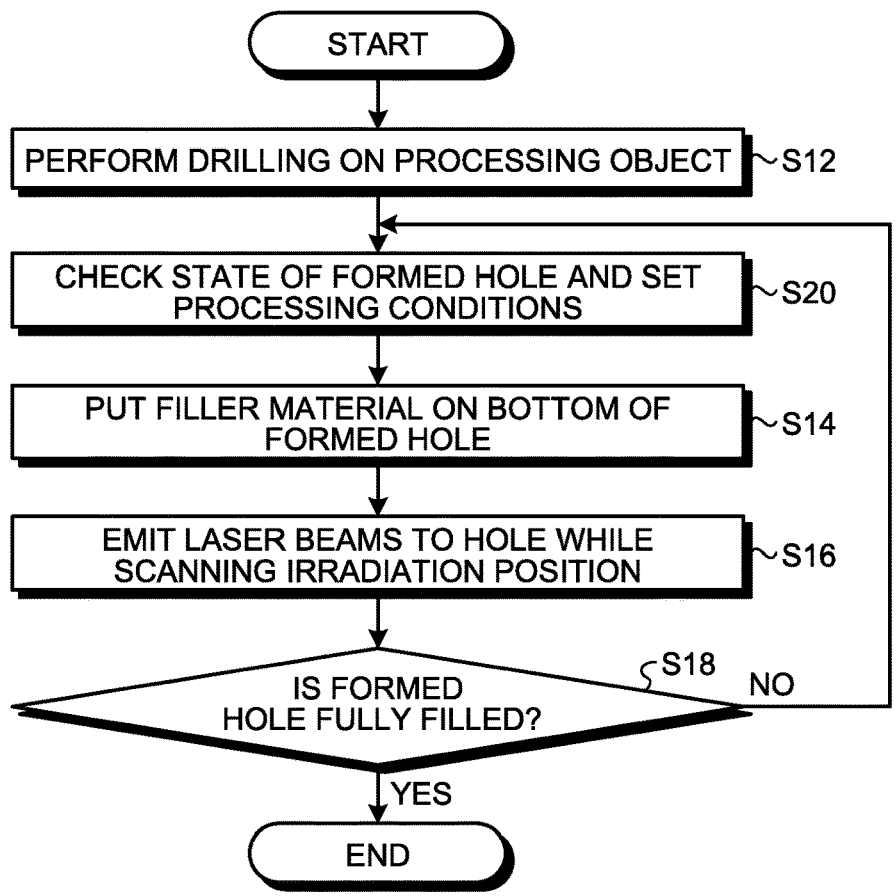
FIG. 11 is a flowchart illustrating another example of the operation of the weldment manufacturing system.

FIG. 11 is a flowchart illustrating another example of the operation of the weldment manufacturing system. The weldment manufacturing system 10 performs drilling on the weldment 30 serving as the workpiece (step S12). The weldment manufacturing system 10 checks the state of the formed hole and sets processing conditions (step S20). Specifically, the weldment manufacturing system 10 acquires the image of the hole 50 by the state detector 18 and detects the depth and the diameter of the hole and the surface state of the hole. The weldment manufacturing system 10 sets the processing conditions on the basis of the detected state of the hole 50. Examples of the processing conditions include a size, a quantity of the feeding filler material, a laser irradiation position in the depth direction (defocusing amount), a laser irradiation pattern, and laser output power.

The weldment manufacturing system 10 puts the filler material on the bottom of the formed hole (step S14). The weldment manufacturing system 10 emits a laser beam to the hole while scanning the irradiation position (step S16). The weldment manufacturing system 10 determines whether the formed hole is fully filled with the filled portions 54 (step S18). If it is determined that the formed hole is not fully filled (No at step S18), the weldment manufacturing system 10 returns to step S20, at which the weldment manufacturing system 10 performs the processing to form the filled portion 54. If it is determined that the formed hole is fully filled (Yes at step S18), the product manufacturing system 10 ends the processing.

The weldment manufacturing system 10 can control at least one of a fusion depth and a solidified form of the filler material 52 by adjusting the laser output power and the defocusing amount, for example. The weldment manufacturing system 10, thus can further reduce a possibility of the occurrence of defects in the weld repairing portion, thereby making it possible to further increase quality of the weld repairing portion.

The weldment manufacturing system 10 detects the state by the state detector 18 and adjusts the processing conditions. The processing conditions may be changed in accordance with the number of layers of formed filled portions 54. The weldment manufacturing system 10 can increase a heat input amount by increasing the laser output power and can increase the laser beam diameter by increasing the defocusing amount.

When the laser irradiation pattern is the concentric multiple circles, the weldment manufacturing system 10 may change the laser output power or the defocusing amount between the circle on the outer diameter side and the circle on the inner diameter side. Specifically, the weldment manufacturing system 10 preferably sets the laser output power or the defocusing amount for the circle on the outer diameter side larger than that for the circle on the inner diameter side when emitting the laser beam. This makes it possible to preferably melt the filler material.

REFERENCE SIGNS LIST

10 Weldment manufacturing system
11 Drilling device
12 Laser beam emitting device
14 Laser beam scanning device
16 Filler material feeding device
18 State detector
20 Control device
22 First galvanometer mirror
24 Second galvanometer mirror
30 Weldment (workpiece)
34 First metallic member
36 Second metallic member
38 Weld line
40 Weld repairing portion
50 Hole
52 Filler material
54 Filled portion

The invention claimed is:

1. A weldment manufacturing method, comprising:
   drilling a hole on a workpiece;
   feeding a filler material to the hole and putting the filler material on a bottom of the hole; and
   melting the filler material by emitting a laser beam to the hole while scanning with the laser beam, so as to fill the hole with the melted filler material, wherein
   a weld repairing portion filling the hole is formed by repeating the feeding and the melting,
   at the melting of the filler material, the laser beam is caused to scan along a circumferential surface of the hole, and
   at the melting of the filler material, a path of the laser beam is concentric multiple circles composed of a plurality of circles having different diameters and arranged in a concentric manner.

2. The weldment manufacturing method according to claim 1, wherein, at the melting of the filler material, the laser beam is caused to scan at a speed between 1 m/sec and 10 m/sec inclusive.

3. The weldment manufacturing method according to claim 1, wherein, at the melting of the filler material, a beam diameter of the laser beam is between 0.6 mm and 1.6 mm inclusive.

4. The weldment manufacturing method according to claim 1, wherein
   the workpiece includes a first metallic member, a second metallic member, and a weld line that bonds the first metallic member and the second metallic member, and
   at least a part of the weld repairing portion overlaps with the weld line.

5. The weldment manufacturing method according to claim 1, wherein the hole satisfies that H/d is between 5 and 20 inclusive, and d is between 1 mm and 20 mm inclusive, where H is a depth of the hole and d is a diameter of the hole.

6. The weldment manufacturing method according to claim 1, further comprising performing a tungsten inert gas (TIG) welding that fills a part of the hole on a surface side of the hole using a wire-shaped filler material.

7. The weldment manufacturing method according to claim 1, further comprising detecting a state of the hole of the workpiece and setting processing conditions for the feeding of the filler material and the melting of the filler material based on the state of the hole.

8. The weldment manufacturing method according to claim 7, wherein the processing conditions include at least one of a size and a quantity of the filler material to be fed, a laser irradiation position in a depth direction, a laser irradiation pattern, and laser output power.

9. A weldment manufacturing method, comprising:
drilling a hole on a workpiece;
feeding a filler material to the hole and putting the filler material on a bottom of the hole; and
melting the filler material by emitting a laser beam to the hole while scanning with the laser beam, so as to fill the hole with the melted filler material, wherein
a weld repairing portion filling the hole is formed by repeating the feeding and the melting,
at the melting of the filler material, the laser beam is caused to scan along a circumferential surface of the hole, and
at the melting of the filler material, a path of the laser beam satisfies that heat input near a border between the hole and the filler material is larger than heat input on a center of the hole.

* * * * *